(12) United States Patent
Gil et al.

(10) Patent No.: US 8,200,202 B2
(45) Date of Patent: Jun. 12, 2012

(54) USER ACTIVITY TRACKING ON PERSONAL CELLULAR TELECOMMUNICATIONS DEVICES

(75) Inventors: Amit Gil, Yehud (IL); Guy Zurawel, Emek Shorek (IL)

(73) Assignee: Celltick Technologies Ltd., Herzliya (IL)

(*) Notice: Subject to any disclaimer, the term of this patent is extended or adjusted under 35 U.S.C. 154(b) by 257 days.

(21) Appl. No.: 12/452,903

(22) PCT Filed: Jul. 31, 2008

(86) PCT No.: PCT/IL2008/001050
§ 371 (c)(1),
(2), (4) Date: Jan. 28, 2010

(87) PCT Pub. No.: WO2009/016630
PCT Pub. Date: Feb. 5, 2009

(65) Prior Publication Data
US 2010/0130196 A1    May 27, 2010

(30) Foreign Application Priority Data
Jul. 31, 2007   (IL) .......................................... 184963

(51) Int. Cl.
*G06F 15/16*    (2006.01)
(52) U.S. Cl. .................. 455/414.1; 455/414.2
(58) Field of Classification Search ............. 455/414.1, 455/414.2; 348/211.4; 705/14.72
See application file for complete search history.

(56) References Cited

U.S. PATENT DOCUMENTS

| | | |
|---|---|---|
| 5,226,177 A | 7/1993 | Nickerson |
| 5,553,314 A | 9/1996 | Grube et al. |
| 5,555,446 A | 9/1996 | Jasinski |
| 5,687,216 A | 11/1997 | Svensson |
| 5,692,032 A | 11/1997 | Seppanen et al. |
| 5,701,580 A | 12/1997 | Yamane et al. |
| 5,812,647 A | 9/1998 | Beaumont et al. |
| 5,822,402 A | 10/1998 | Marszalek |
| 5,870,030 A | 2/1999 | DeLuca et al. |
| 5,878,033 A | 3/1999 | Mouly |
| 5,926,104 A | 7/1999 | Robinson |
| 5,960,366 A | 9/1999 | Duwaer |
| 6,018,522 A | 1/2000 | Schultz |
| 6,060,997 A | 5/2000 | Taubenheim et al. |
| 6,064,376 A | 5/2000 | Berezowski et al. |

(Continued)

FOREIGN PATENT DOCUMENTS
EP    0955779    11/1999
(Continued)

OTHER PUBLICATIONS

International Search Report for International Application No. PCT/IL08/01050 mailed Dec. 3, 2008.

(Continued)

*Primary Examiner* — Sam Bhattacharya
(74) *Attorney, Agent, or Firm* — Pearl Cohen Zedek Latzer, LLP

(57) ABSTRACT

User activity tracking on personal cellular telecommunications devices including a User Interaction Software Module (UISM) for data handling of display message information and user interaction information regarding user interaction with display messages. The UISMs enable handset side or network side determining user impressions of instantaneously displayed display messages. The UISMs include onboard instruction sets including destination dependent data handling instructions for user click information. Onboard instruction sets can operate in conjunction with display component embedded instruction sets regarding data logging and data reporting of display message information and/or user impression information and/or user click information.

41 Claims, 9 Drawing Sheets

U.S. PATENT DOCUMENTS

| | | |
|---|---|---|
| 6,169,882 B1 | 1/2001 | Amma |
| 6,173,316 B1 | 1/2001 | De Boor et al. |
| 6,212,203 B1 | 4/2001 | Anderson et al. |
| 6,230,019 B1 | 5/2001 | Lee |
| 6,298,239 B1 | 10/2001 | Yonemoto et al. |
| 6,341,228 B1 | 1/2002 | Hubbe et al. |
| 6,363,419 B1 | 3/2002 | Martin, Jr. et al. |
| 6,370,389 B1 | 4/2002 | Isomursu et al. |
| 6,385,461 B1 | 5/2002 | Raith |
| 6,413,160 B1 | 7/2002 | Vancura |
| 6,416,414 B1 | 7/2002 | Stadelmann |
| 6,418,308 B1 | 7/2002 | Heinonen et al. |
| 6,434,398 B1 | 8/2002 | Inselberg |
| 6,441,720 B1 | 8/2002 | Kawashima |
| 6,442,529 B1 | 8/2002 | Krishan et al. |
| 6,443,840 B2 | 9/2002 | Von Kohorn |
| 6,484,148 B1 | 11/2002 | Boyd |
| 6,505,046 B1 | 1/2003 | Baker |
| 6,522,876 B1 | 2/2003 | Weiland et al. |
| 6,522,877 B1 | 2/2003 | Lietsalmi et al. |
| 6,583,714 B1 | 6/2003 | Gabou et al. |
| 6,615,039 B1 | 9/2003 | Eldering |
| 6,628,936 B1 | 9/2003 | Furuya |
| 6,671,715 B1 | 12/2003 | Langseth et al. |
| 6,688,982 B2 | 2/2004 | Moodie et al. |
| 6,745,011 B1 | 6/2004 | Hendrickson et al. |
| 6,807,254 B1 | 10/2004 | Guedalia et al. |
| 6,832,314 B1 | 12/2004 | Irvin |
| 6,968,175 B2 | 11/2005 | Raivisto et al. |
| 6,970,712 B1 | 11/2005 | Vo |
| 7,003,327 B1 | 2/2006 | Payne et al. |
| 7,028,261 B2 | 4/2006 | Smyth et al. |
| 7,039,423 B2 | 5/2006 | Daniel et al. |
| 7,096,044 B2 | 8/2006 | Gil et al. |
| 7,113,809 B2 | 9/2006 | Noesgaard et al. |
| 7,158,753 B2 | 1/2007 | Kagan et al. |
| 7,181,225 B1 | 2/2007 | Moton, Jr. et al. |
| 7,191,343 B2 | 3/2007 | Tuoriniemi et al. |
| 7,219,123 B1 | 5/2007 | Fiechter et al. |
| 7,251,476 B2 | 7/2007 | Cortegiano |
| 7,370,283 B2 | 5/2008 | Othmer |
| 7,551,913 B1 | 6/2009 | Chien |
| 7,551,919 B2 | 6/2009 | Cortegiano |
| 7,561,899 B2 | 7/2009 | Lee |
| 7,689,167 B2 | 3/2010 | Sengupta et al. |
| 7,747,264 B2 | 6/2010 | Fiorini |
| 7,752,209 B2 | 7/2010 | Ramer et al. |
| 7,779,023 B2 | 8/2010 | Smyth et al. |
| 7,801,541 B2 | 9/2010 | Daniel et al. |
| 7,860,951 B2 | 12/2010 | Gil et al. |
| 2001/0003099 A1 | 6/2001 | Von Kohorn |
| 2001/0020957 A1 | 9/2001 | Ringot |
| 2002/0054090 A1 | 5/2002 | Silva et al. |
| 2002/0138331 A1 | 9/2002 | Hosea et al. |
| 2003/0005466 A1 | 1/2003 | Liao |
| 2003/0013439 A1 | 1/2003 | Daniel et al. |
| 2003/0065706 A1 | 4/2003 | Smyth et al. |
| 2003/0181201 A1 | 9/2003 | Bomze et al. |
| 2003/0191653 A1 | 10/2003 | Birnbaum et al. |
| 2003/0229534 A1 | 12/2003 | Frangione et al. |
| 2004/0049419 A1 | 3/2004 | Knight |
| 2004/0077340 A1 | 4/2004 | Forsyth |
| 2004/0078427 A1 | 4/2004 | Gil et al. |
| 2004/0127199 A1 | 7/2004 | Kagan et al. |
| 2004/0157628 A1 | 8/2004 | Daniel et al. |
| 2005/0015307 A1 | 1/2005 | Simpson et al. |
| 2005/0060370 A1 | 3/2005 | Xue et al. |
| 2005/0149618 A1 | 7/2005 | Cheng |
| 2005/0154996 A1 | 7/2005 | Othmer |
| 2005/0213511 A1 | 9/2005 | Reece et al. |
| 2005/0222908 A1 | 10/2005 | Altberg et al. |
| 2006/0004627 A1 | 1/2006 | Baluja |
| 2006/0030370 A1 | 2/2006 | Wardimon |
| 2006/0064350 A1 | 3/2006 | Freer |
| 2006/0069611 A1 | 3/2006 | Litt et al. |
| 2006/0160578 A1 | 7/2006 | Daniel et al. |
| 2006/0190616 A1 | 8/2006 | Mayerhofer et al. |
| 2006/0204944 A1 | 9/2006 | Preskill |
| 2006/0234696 A1 | 10/2006 | Cho |
| 2007/0021065 A1 | 1/2007 | Sengupta et al. |
| 2007/0055565 A1 | 3/2007 | Baur et al. |
| 2007/0106557 A1 | 5/2007 | Varghese |
| 2007/0123246 A1 | 5/2007 | Daniel et al. |
| 2007/0178889 A1 | 8/2007 | Cortegiano et al. |
| 2007/0203801 A1 | 8/2007 | Istfan |
| 2007/0218865 A1 | 9/2007 | Daniel et al. |
| 2007/0218882 A1 | 9/2007 | Daniel et al. |
| 2007/0218919 A1 | 9/2007 | Ozulkulu et al. |
| 2007/0276729 A1 | 11/2007 | Freer |
| 2007/0288856 A1 | 12/2007 | Butlin et al. |
| 2008/0021783 A1 | 1/2008 | Varghese |
| 2008/0091518 A1 | 4/2008 | Eisenson et al. |
| 2008/0139224 A1 | 6/2008 | Stone |
| 2008/0160956 A1 | 7/2008 | Jackson et al. |
| 2008/0160970 A1 | 7/2008 | Srinivas Reddy et al. |
| 2008/0187112 A1 | 8/2008 | Koberstein et al. |
| 2009/0150400 A1 | 6/2009 | Abu-Hakima et al. |
| 2009/0163189 A1 | 6/2009 | Gil et al. |
| 2010/0016025 A1 | 1/2010 | Koren et al. |
| 2010/0081462 A1 | 4/2010 | Neria et al. |
| 2010/0130196 A1 | 5/2010 | Gil et al. |
| 2010/0312643 A1 | 12/2010 | Gil |
| 2011/0098091 A1 | 4/2011 | Daniel et al. |

FOREIGN PATENT DOCUMENTS

| | | |
|---|---|---|
| GB | 2320600 | 6/1998 |
| GB | 2327567 | 1/1999 |
| GB | 2362550 | 11/2001 |
| GB | 2391363 | 2/2004 |
| WO | WO 98/10604 | 3/1998 |
| WO | WO 98/41013 | 9/1998 |
| WO | WO 99/42964 | 8/1999 |
| WO | WO 00/22906 | 4/2000 |
| WO | WO 00/77979 | 12/2000 |
| WO | WO 01/45317 | 6/2001 |
| WO | WO 01/52558 | 7/2001 |
| WO | WO 01/52572 | 7/2001 |
| WO | WO 02/087267 | 10/2002 |

OTHER PUBLICATIONS

Gromakiv, "Mobile Wireless Communication Standards and Systems", Mobile TeleSystems-EcoTrands, (1997), Chapter 4, pp. 67-70, with English translation.

Afanasev, et al., "Evolution of Mobile Networks", (Inventory #5554), Moscow, 2001, pp. 84-87 with English translation.

Office Action issued by the United States Patent and Trademark Office for U.S. Appl. No. 11/798,571 dated Jan. 25, 2010.

Office Action issued by the United States Patent and Trademark Office for U.S. Appl. No. 11/798,571 dated Jun. 28, 2010.

Office Action issued by the United States Patent and Trademark Office for U.S. Appl. No. 11/798,571 dated Dec. 23, 2010.

Office Action issued by the United States Patent and Trademark Office for U.S. Appl. No. 11/798,571 dated Oct. 14, 2011.

Office Action issued by the United States Patent and Trademark Office for U.S. Appl. No. 12/982,686 dated May 2, 2011.

Office Action issued by the United States Patent and Trademark Office for U.S. Appl. No. 11/385,650 dated Jun. 26, 2008.

Office Action issued by the United States Patent and Trademark Office for U.S. Appl. No. 11/385,650 dated Jan. 26, 2009.

Office Action issued by the United States Patent and Trademark Office for U.S. Appl. No. 11/385,650 dated Jun. 8, 2009.

Office Action issued by the United States Patent and Trademark Office for U.S. Appl. No. 11/798,572 dated Jun. 25, 2010.

Office Action issued by the United States Patent and Trademark Office for U.S. Appl. No. 11/798,572 dated Jan. 19, 2010.

Office Action issued by the United States Patent and Trademark Office for U.S. Appl. No. 11/798,572 dated Jan. 21, 2011.

Office Action issued by the United States Patent and Trademark Office for U.S. Appl. No. 11/798,572 dated Oct. 14, 2011.

Office Action issued by the United States Patent and Trademark Office for U.S. Appl. No. 12/223,806 dated Jun. 28, 2011.

Office Action issued by the United States Patent and Trademark Office for U.S. Appl. No. 12/448,254 dated Jul. 25, 2011.

Office Action issued by the United States Patent and Trademark Office for U.S. Appl. No. 12/448,211 dated Aug. 18, 2011.
Office Action issued by the United States Patent and Trademark Office for U.S. Appl. No. 12/227,973 dated Sep. 23, 2011.
Office Action issued by the United States Patent and Trademark Office for U.S. Appl. No. 12/448,254 dated Jan. 5, 2012.
Office Action issued by the United States Patent and Trademark Office for U.S. Appl. No. 12/982,686 dated Jan. 12, 2012.

| VALUE | USER ACTION |
|---|---|
| 1 | NEXT MESSAGE (SCROLL ← → ↑ ↓) |
| 2 | OPEN RESPONSE MENU |
| 3 | REQUEST MORE INFO |
| 4 | EXPAND TICKER TO FULL SCREEN DISPLAY |
| 5 | PRESS END KEY |
| 6 | NON RELATED USER ACTION |

| LOGGING CATEGORY | LOGGING INSTRUCTION |
|---|---|
| 1 | DO NOT LOG |
| 2 | COUNT EVENT |
| 3 | LOG DATE AND TIME |
| 4 | LOG DATE AND TIME AND UA |

FIG.5

| REPORTING CATEGORY | REPORTING INSTRUCTION |
|---|---|
| 1 | IMMEDIATE REPORTING USING SMS |
| 2 | IMMEDIATE REPORTING USING IP |
| 3 | REPORT USING PIGGYBACKING |
| 4 | RECORD AND STORE UNTIL PULLED BY THE SERVER |
| 5 | PERIODIC 1 (REPORT EVERY 30 MINUTES) |
| 6 | PERIODIC 1 (REPORT EVERY DAY) |
| 7 | DO NOT MONITOR |
| 8 | SMART PULL 1 (PIGGYBACK OR PULL, FIRST TO COME) |
| 9 | SMART PERIODIC 1 (PIGGYBACK OR PERIODIC, FIRST TO COME) |

FIG.6

| RECORD NUMBER | DISPLAY COMPONENT ID | USER ID/MSISDN | DISPLAY COUNT | TYPE I USER ACTION COUNT | TYPE IIA USER ACTION COUNT | TYPE IIB USER ACTION COUNT |
|---|---|---|---|---|---|---|
| 1 | 100117 | +972544386386 | 3 | 0 | 1 | 0 |
| 2 | 100117 | +972544386311 | 6 | 0 | 2 | 1 |
| 3 | 100118 | +972544385555 | 5 | 1 | 1 | 0 |

FIG.9

| RECORD NUMBER | USER ID/MSISDN | DISPLAY COMPONENT ID | EVENT TIME | EVENT DATE | USER ACTION |
|---|---|---|---|---|---|
| 1 | +972544386386 | 100231 | 12:31 | 1/7/07 | 3 |
| 2 | +972544386311 | 100119 | 14:45 | 1/7/07 | 2 |
| 3 | +972544385555 | 103987 | 15:07 | 1/7/07 | 1 |

FIG.10

| RECORD NUMBER | USER MSISDN | DISPLAY COMPONENT ID | EVENT TIME | EVENT DATE | ACTIVATED OUTBOUND RESPONSE MECHANISM | TRANSACTION TYPE | DESTINATION | SESSION LENGTH | REMARKS |
|---|---|---|---|---|---|---|---|---|---|
| 1 | +9725443863866 | 100231 | 12:31 | 1/7/07 | 1 | VOICE | +9725454545 | 1:02 | |
| 2 | +972544386311 | 100119 | 14:45 | 1/7/07 | 2 | WAP | HTTP://www.amazon.com/ID=10 9564 | 3:24 | |
| 3 | +972544385555 | 103987 | 15:07 | 1/7/07 | 1 | SMS | | N/A | CODE= RING 1007 |

| RECORD NUMBER | ACTIVATED OUTBOUND RESPONSE MECHANISM | DESTINATION | DATA HANDLING |
| --- | --- | --- | --- |
| 1 | WAP | www.livescreen.com/* | NO |
| 2 | WAP | www.celltick.com/* | NO |
| 3 | WAP | OTHERS | YES |
| 4 | SMS | 999* | NO |
| 5 | SMS | OTHERS | YES |

FIG.12

USER ACTIVITY TRACKING ON PERSONAL CELLULAR TELECOMMUNICATIONS DEVICES

CROSS-REFERENCE TO RELATED APPLICATIONS

This application is the US national phase filing of International Application PCT/IL2008/001050 filed 31 Jul. 2008, the entire contents of which are incorporated herein by reference.

FIELD OF THE INVENTION

The invention pertains to user activity tracking on personal cellular telecommunications devices in general and user interaction with display messages in particular. For the purpose of the present invention, the term "personal cellular telecommunications device" refers to a wide range of portable handheld electronic devices having small display screens and voice communications capabilities. The term "personal cellular telecommunications device" is intended to include inter alia radio telephones, smart phones, communicators, and the like.

BACKGROUND OF THE INVENTION

Celltick Technologies Ltd. (hereinafter "Celltick" the Applicants of the present invention) have invented an idle screen platform for mostly silently streaming display messages on personal cellular telecommunications devices as illustrated and described in PCT International Publication No. WO 01/52572, the contents of which are incorporated herein by reference. Display messages each include one or more display components which may be information items, for example, news items, sports items, and the like, or adverts for goods, services, and the like. The display components can be text only, graphic only, multimedia clips, combinations of same, and the like. Display messages can be interactive or non-interactive. Interactive display components enable a user to obtain additional content in the case of an interactive information item or additional advertising information in the case of an interactive advert. Interactive display components necessarily require at least one user click for activating an outbound response mechanism for obtaining additional information. User clicks for invoking interactive display components differ between personal cellular telecommunications devices depending on their Man Machine Interfaces (MMIs) and include inter alia depressing a pushbutton, selecting a soft key, selecting a touch screen option, and the like. Outbound response mechanisms include inter alia placing a voice call to a call center, sending a text message to a $3^{rd}$ party, initiating a data session, for example, a WAP session, a USSD session, and the like. Invoking of some interactive display components leads to displaying an interactive option menu listing at least two outbound response mechanisms. Some interactive option menus may include the same type of outbound response mechanism twice but having different destinations, for example, browsing to two different WAP pages, placing voice calls to two different callback numbers, and the like.

Celltick market their idle screen platform under the tradename LIVESCREEN™. Further information is available online at www.celltick.com. Celltick's idle screen platform is being commercially implemented by an ever increasing list of cellular operators around the world who typically brand their idle screen service. For example, Vodafone in India have launched the service under the name Vodafone Flash. Cellular operators typically prefer to implement their idle screen service with a single display message format for display messages for facilitating user acceptance and promoting user interaction with display messages. The most popular display message formats are illustrated and described below with reference to FIGS. 4A to 4C. Over 40 million mobile users worldwide are now viewing millions of display messages, clicking on millions of interactive display components, and ordering considerable volumes of goods and services.

Cellular operators can transmit transmission messages with one or more display components ready for immediate display as display messages on personal cellular telecommunications devices. Alternatively, cellular operators can transmit transmission messages with one or more display components for initial storage in carousels of display components. Carousels can be general purpose or dedicated for particular types of display components, for example, information items only, adverts only, and the like. Personal cellular telecommunications devices can select one or more display components for display as display messages. Cellular operators can transmit transmission messages including display components over either Point-To-Point (P2P) or Point-To-MultiPoint (P2MP) transmission technologies.

Mobile industry participants including inter alia cellular operators, content providers, service providers, mobile advertisers, and the like, have considerable interest in user interaction information for profiling purposes, segmentation purposes, revenue sharing schemes, and the like.

U.S. Pat. No. 6,745,011 to Hendrickson et al. illustrates and describes systems and methods for measuring wireless device and wireless network usage and performance metrics. The system includes a wireless device with a processor and memory, data gathering software installed on the wireless device for logging event data 240, device parametric data 230a, network parametric data 220a, location information 250a and time information 260a (see Col. 7, lines 63 to 68). A plurality of wireless devices may be distributed to a panel of selected users. Automatic data delivery may be triggered on a periodic basis, or alternatively data delivery may be launched via user or control center driven activity.

Event data 240a includes any data relating to activity on the device by a user. For example, event data includes data from data applications, device applications and event statistics. Data application includes, for example, microbrowser or equivalent internet browsing activity, web clipping applications, mobile commerce transactions, mobile advertising activity, e-mail activity, and Bluetooth applications. Device applications include, for example, games, address books, personal management software and media players used for streaming audio and video (see Col. 8, lines 11 to 23).

Data gathered by the data gathering software is transmitted via a wireless link to a control center that manages the logging and quality control processes of the data from each wireless device in the field as well as the overall administration of the network. A data warehouse/mining application processes the collected data to generate information including usage, service functionality, network and device performance metrics.

FIGS. 5a to 5d set forth samples of event type data gathered by the data gathering software and locations from which various metrics corresponding to event types are gathered. FIG. 5b-2 shows the event types for M-Advertising are as follows:

| Event Type | Metrics | MSM Location |
|---|---|---|
| Ad Displayed | TD-LL<br>UPID<br>Ad ID | Browser<br>GPS Processor |
| Ad Selected | TD-LL<br>UPID<br>Ad ID | Browser<br>GPS Processor |

TD-LL Stands for Time, Date, Long-Lat

Sample reports are divided into three categories as follows: First, Usage, Audience, and Purchase Products. Second, Network/Device Performance Products. And third, Integrated Products. Sample product reports of the Usage, Audience, and Purchase Products category include inter alia Data Traffic Report, Voice Statistics Report, Demographics Report, M-commerce Report, Non-Web Digital Media Report, Advertising Report, User Experience Report, and Technical Report (see Col. 13, line 45 to Col. 14, line 51). The Advertising Report includes Ads viewed/redeemed, Top advertisers, Top host sites, Reach and Cut by demographics (see Col. 14, line 34 to line 39).

U.S. Pat. No. 6,968,175 to Raivisto et al. illustrates and describes a method and system for revenue sharing between mobile operators and content providers. The content providers, through a data network, provide data services to the end users of the mobile operators. For the data services, the content providers are paid by the mobile operators based on the revenue collected by the mobile operators from the end users using the services. An intermediate proxy is disposed between a mobile operator and the data network to keep track of the data amount transmitted by the content providers and the users and to keep track of the revenue sharing agreements established between that mobile operator and the content providers. Additionally, an intermediate proxy is linked to each content provider to keep track of the data amount transmitted to the end users via a mobile operator and to keep track of the revenue sharing agreement with that mobile operator.

SUMMARY OF THE INVENTION

The present invention is directed toward user activity tracking on personal cellular telecommunications devices (hereinafter abbreviated to "devices") in general, and user interaction with display messages in particular. The display messages can be displayed as part of a user invoked data application. Alternatively, an idle screen application can display messages for automatically replacing a device's so-called idle screen in a screen saver like manner. So-called idle screens occur after complete power up and before any user activity or network side events like an incoming voice call. Such idle time display of display messages is ongoing for as long as a device is powered up and continues when a user is not using his device, for example, when he is carrying his device, recharging his device, and the like. The display messages typically include both interactive and non-interactive display components but can include either interactive only or non-interactive only display components.

The present invention is based on the premise that user actions occurring during an instantaneously displayed display message are indicative that a user has viewed the display message (hereinafter referred to as a "user impression") to at least some degree as opposed to not having viewed it at all. The aforesaid Hendrickson et al.'s list of event type data gathered lists "Ad displayed" and "Ad selected" corresponding to user clicks on interactive display components (see U.S. Pat. No. '011, FIG. 5b-2 on Sheet 10 of 18) and Hendrickson et al.'s Advertising Report lists "Ads viewed/redeemed" (see U.S. Pat. No. '011, Col. 14, line 35). Against this, the present invention proposes data logging and data reporting of user impressions which are absent from the aforesaid Hendrickson et al.'s disclosure insofar as users typically view many more display messages than they actually select or redeem but less than the number of displayed display messages. For example, a user's device may have displayed 15 display messages over a 1 hour period of which he viewed five but didn't select any.

User impressions arise from two types of user actions as follows:

Type I user actions occurring during an instantaneously displayed display message but not relating thereto. Type I user actions apply equally to interactive and non-interactive display components and include inter alia depressing an alphanumeric pushbutton for initiating a voice call, starting to draft a text message, for example, SMS, email and the like, operating a device's camera, and the like.

Type II user actions occurring during an instantaneously displayed display message and relating thereto and therefore typically indicate a greater likelihood of a user viewing a display message than a Type I user action. Type II user actions can be classed as either Type IIA user actions which apply equally to interactive and non-interactive display components or Type IIB user actions which apply exclusively to interactive display components. Type IIA user actions include inter alia scrolling left or right or up or down to the next display message, pressing an end key to dismiss a display message, expanding a ticker to a full screen display, and the like. Type IIB user actions invoke interactive display components for activating an outbound response mechanism. Type IIB user actions are equivalent to the aforesaid user clicks and include inter alia opening a response menu, requesting more information, and the like.

The present invention includes installing personal cellular telecommunications devices with a User Interaction Software Module (UISM) for processing display message information and user interaction information and transmitting same to a network side Data Collection Entity (DCE) for reporting purposes, analysis purposes, and the like. UISMs can include an onboard instruction set including data handling instructions for processing display message information and user interaction information in a standalone manner. Alternatively, onboard instruction sets can be programmed to operate in conjunction with display component embedded instruction sets. The former approach is simpler to implement but the latter approach facilitates greater control over the data handling of individual display message events, individual user impression events, and individual user click events. Display message information and user interaction information can be pushed from devices to the DCE, pulled from devices by the DCE, or a combination of being pushed and pulled. Cellular operators can Over The Air (OTA) periodically reconfigure onboard instruction sets and can configure different onboard instruction sets for different users depending on user demographics, usage, and the like.

UISMs can determine user impression events occurring during instantaneously displayed messages or alternatively transmit two disparate streams of user action information including timing information regarding user action events and display component information including timing information regarding display component events to the DCE for network side determination. Handset side determination of user impression events can be implemented by means of an available Application Program Interface (API) native function for returning whether a user action occurred during an instantaneously displayed display message. Alternatively, user actions can be initially logged during a display of an instantaneously displayed display message, and correlation be done subsequently per display message.

Onboard instruction sets intended to operate in a standalone manner include data logging instructions and/or data reporting instructions for display component events, user impression events, and user click events. Exemplary data logging instructions include inter alia do not log, count event only, log date and time, log date and time and user action, and the like. Exemplary data reporting instructions include inter alia report voice calls on a weekly basis, report advert display components immediately, wait for pull, do not report, and the like.

In the alternative split arrangement, the onboard instruction sets include data handling instructions for each of a set of predetermined data logging and data reporting categories and non-interactive display components have embedded instruction sets preferably including category identifiers for specifying predetermined categories of data logging and data reporting of display component events and user impression events. Along these lines, interactive display components have embedded instruction sets preferably including category identifiers for specifying predetermined categories of data logging and data reporting of display component events, user impression events and also user click events. Alternatively, the same category identifier can apply to display component events, user impression events, and user click events. This aspect of the present invention equally applies to cellular telecommunications networks presently displaying display messages on their users' devices either as part of a user invoked data application or an idle screen application.

Onboard instruction sets can optionally include destination dependent data handling instructions for interactive display components. This capability is intended, for example, when no user click information is required for some destinations of outbound response mechanisms, or the user click information may be otherwise more readily acquired by server side tracking means. For example, onboard instruction sets can include data reporting instructions such as "Report WAP transactions to URLs different than www.livescreen.com/*", "Do not report voice calls to 1-800 call back numbers, and the like. In such cases, onboard instruction sets can include two different data handling instructions applying to two outbound response mechanism of the same type wherein one data handling instruction applies to one destination of an outbound response mechanism and the other data handling instruction applies to another destination of the same type of outbound response mechanism. Such instruction sets are particularly suitable for processing user click information arising from interactive display components which have two outbound response mechanisms of the same type but having two different destinations. This aspect of the present invention equally applies to cellular telecommunications networks presently displaying interactive display messages on their users' devices either as part of a user invoked data application or an idle screen application Mobile industry participants are interested in display component information and user impression information ranging from straightforward event counting to additional event information including inter alia user MS-ISDNs of devices on which display components were displayed, user MS-ISDNs of users originated user impression events, date and time and user action originating a user impression event, and the like. User click information of interest to mobile industry participants is typically dependent on an activated outbound response mechanism. User click information regarding voice calls typically includes the called party number, date, time and duration. User click information regarding a WAP session typically includes the destination URL, date, time and duration, and optionally whether an order was made, for example, an online purchase on that site.

Mobile industry participants can monetize display component information, user impression information and user click information using interne type monetization schemes. Such monetization schemes include inter alia Cost Per Click (CPC) payment schemes in which mobile advertisers pay a predetermined amount per user click event, Cost Per Mille (CPM) payment schemes in which mobile advertisers pay a predetermined amount per predetermined number of user impression events or display component events, and the like. Thus, mobile industry participants are interested in user click events for both CPC and CPM payment schemes. And, mobile industry participants are interested in display component events and user impression events for CPM payment schemes. Generally speaking, interactive and non-interactive advert display components are typically easier to monetize than their counterpart interactive and non-interactive information item display components. Also, Type II user actions are easier to monetize than Type I user actions since they indicate a greater likelihood of users viewing display messages.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 5 is a table of an enumerated list of data logging categories and their corresponding data logging instructions;

FIG. 6 is a table of an enumerated list of data reporting categories and their corresponding data reporting instructions;

FIG. 9 is a table showing sample display component records of a Display Component Record Table at the Data Collection Entity;

FIG. 10 is a table showing sample user impression records of a User Impression Record Table at the Data Collection Entity;

FIG. 11 is a table showing sample user click records of a User Click Record Table at the Data Collection Entity; and FIG. 12 is an enumerated list of destination dependent data handling instruction.

DETAILED DESCRIPTION OF PREFERRED EMBODIMENTS OF THE INVENTION

Figure 1:
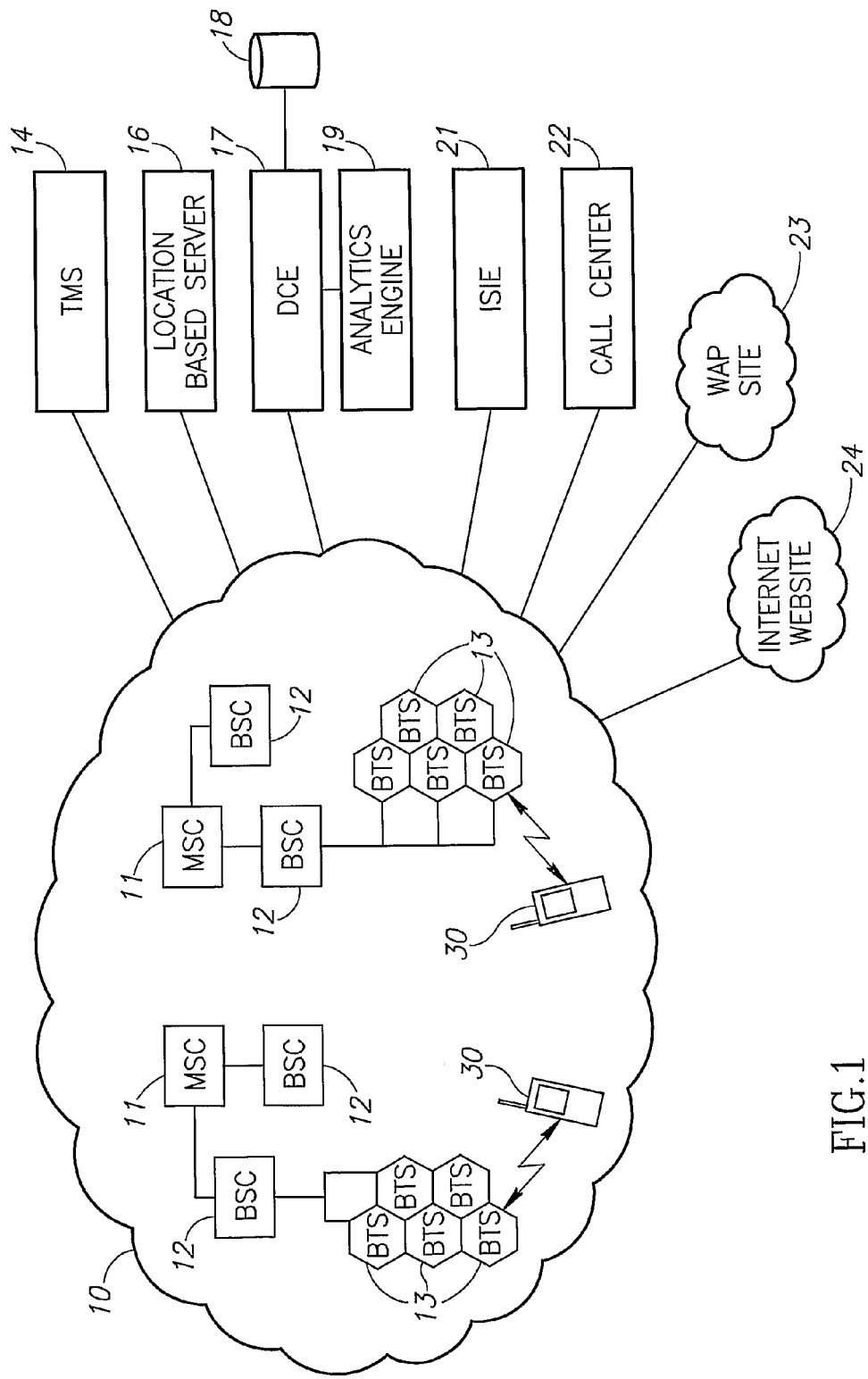
FIG. 1 is a schematic representation of a cellular telecommunications network including a Data Collection Entity for user activity tracking on personal cellular telecommunications devices in accordance with the present invention.

FIG. 1 shows a cellular telecommunications network 10 including a plurality of MSCs 11, a plurality of BSCs 12, and a plurality of individually addressable BTSs 13 for transmitting transmission messages to devices 30. The devices 30 include inter alia simple handset phones, smartphones, combined PDA/phones, combined MP3 music players/phones, and the like. GSM devices 30 include a host Mobile Equipment (ME) 31, and a resident Subscriber Identity Module (SIM) card 32. The cellular telecommunications network 10 includes a Transmission Message Server (TMS) 14 for transmitting P2P and/or P2MP transmission messages to devices 30. The TMS 14 is preferably connected to a Location Based Server (LBS) 16 for transmitting location based display components to the devices 30.

The cellular telecommunications network 10 includes a Data Collection Entity (DCE) 17 including a database 18 for maintaining user impression information, user click information, user interaction information, display component information, and the like, and an analytics engine 19 for data analysis of same. The cellular telecommunications network 10 also includes an Instruction Set Input Entity (ISIE) 21 for inputting onboard instruction sets for configuring on devices 30.

The cellular telecommunications network 10 is connected to a call center 22 for enabling users to receive further details regarding adverts which they are interested in, ordering products and services, and the like. The cellular telecommunications network 10 is also connected to WAP sites 23, the Internet 24, and the like, for providing additional content and additional advertising information.

Figures 2, 3:
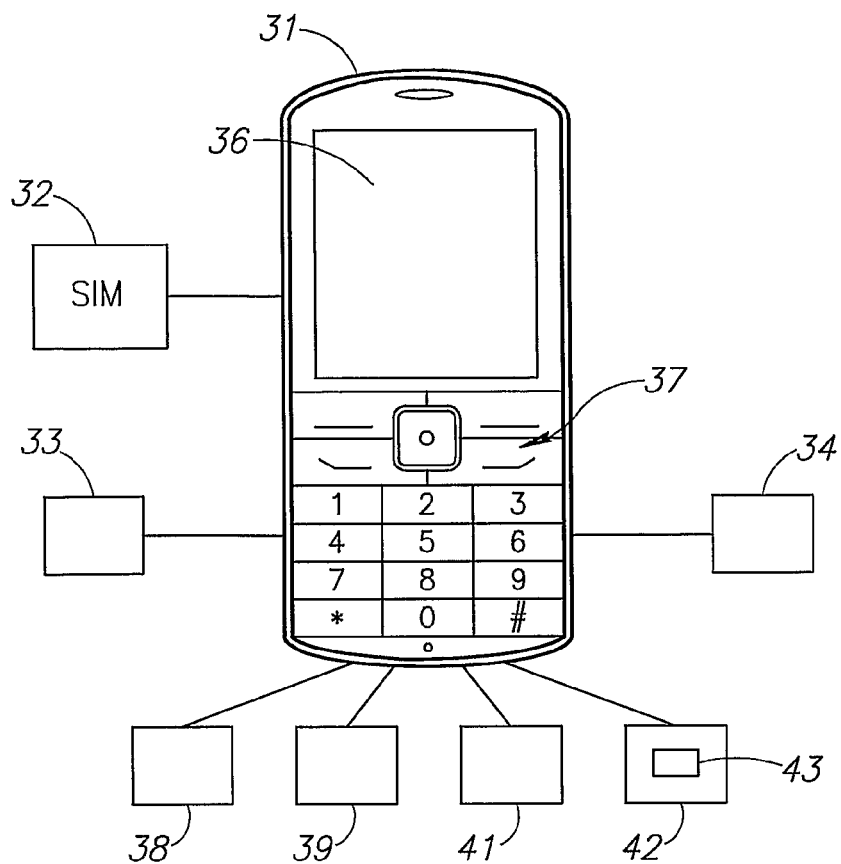
FIG. 2 is a schematic representation of a personal cellular telecommunications device for user activity tracking thereon in accordance with the present invention.
FIG. 3 is a table of an enumerated list of user actions.

FIG. 2 shows devices 30 include a cellular network interface 33 for bi-directional interfacing with the cellular telecommunications network 10, an operating system 34 in communication with the cellular network interface 33, a display screen 36, and a Man Machine Interface (MMI) 37 for interfacing with the device 30. The devices 30 include the following modules: Transmission Message Module (TMM) 38 for receiving and processing transmission messages including display components for display on the display screen 36. Display Message Module (DMM) 39 for displaying display messages on the display screen 36 during either a user initiated data application or an idle screen application. The DMM 39 may combine two or more display components to form display messages. User Interaction Software Module (UISM) 41 for data handling of display message information and user interaction information with display messages. Instruction Set Module 42 for being pre-configured with an onboard instruction set 43 which are typically Over The Air (OTA) periodically updated and can differ for different users. The instruction set 43 includes data handling instructions regarding display component information, user impression information and user click information. The instruction set 43 can optionally include destination dependent data handling instructions as applicable to interactive display components only.

Exemplary enumerated lists of data logging categories and their corresponding data logging instructions and data reporting categories and their corresponding data reporting instructions are shown respectively in FIGS. 5 and 6. Exemplary enumerated list of data handling instructions with destination conditions for different types of outbound response mechanisms is shown in FIG. 12. Exemplary destination dependent data handling instructions include inter alia log and report all outbound WAP data sessions with the exception of those having URL destinations www.livescreen.com/* and www.celltick.com/*. Similarly, destination dependent data handling instructions include inter alia log and report all SMSs with the exception of those having a 999* destination. Data handling instructions with destination conditions may apply to one type of outbound response mechanism, for example, data sessions, but not another type, for example, voice calls.

FIG. 3 shows an enumerated list of user actions which a user can execute during the display of display messages on the display screen 36. The user actions enumerated 1 to 5 are regarded as Type II user actions when they occur during an instantaneously displayed display message since they are directly related with an instantaneously displayed display message. Any other user action, for example, depressing an alphanumeric pushbutton to start drafting a text message or initiate a voice call, operating a camera's device, and the like, occurring during an instantaneously displayed display message is regarded as a Type I user action since it not directed related with an instantaneously displayed display message. Such Type I user actions are enumerated with the value 6.

Figure 4A:
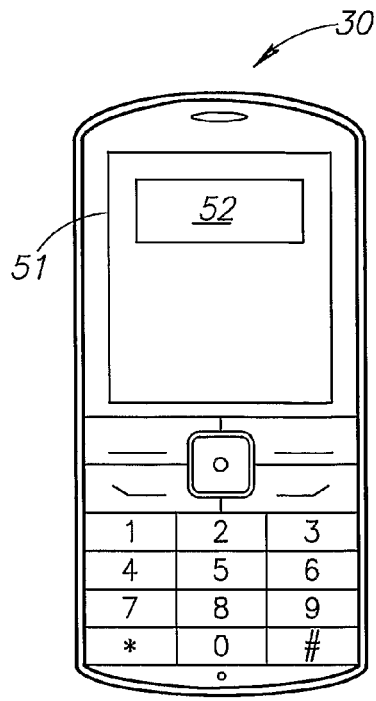
FIG. 4A is a schematic representation of a first display format of a display message with a single display component.
Figure 4B:
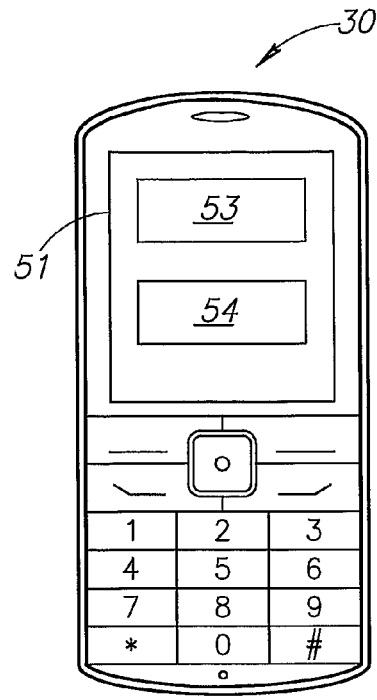
FIG. 4B is a schematic representation of a second display format of a display message with a pair of display components.
Figure 4C:
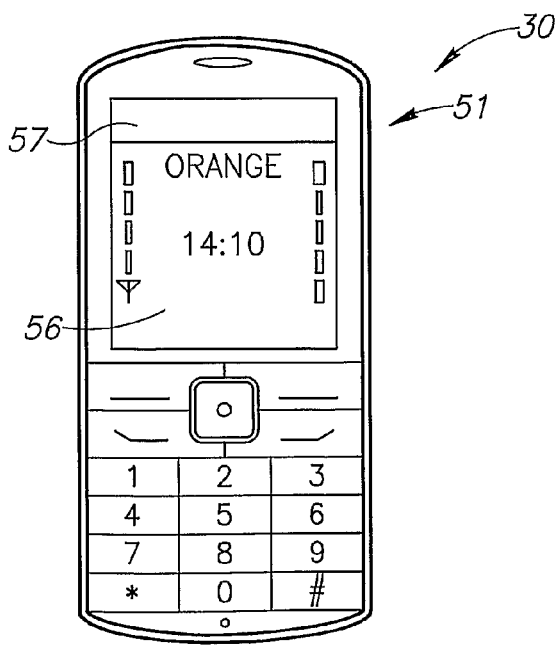
FIG. 4C is a schematic representation of a third display format of a display message including an idle screen and a ticker of display components.

FIGS. 4A to 4C show a device 30 displaying a display message 51 in three different display formats. FIG. 4A shows a first display format with a single display component 52. FIG. 4B shows a second display format with a pair of display components 53 and 54. FIG. 4C shows a third display format including an idle screen 56 with a ticker 57 which may or may not be expandable to occupy more of the display screen 36. The display components 52, 53, 54 and 57 may or may not be interactive for enabling a user to obtain additional information. All the enumerated user actions 1 to 6 except the "Expand ticker" user action 4 apply to the display message 51's three formats. The enumerated user action 4 applies to FIG. 4C's idle screen format only.

Figure 7A:
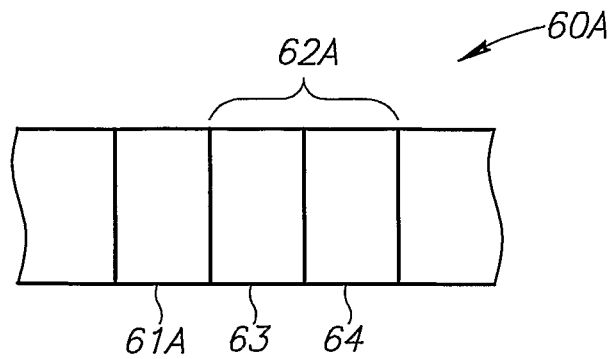
FIG. 7A is a schematic representation of a transmission message including a non-interactive display component with an embedded instruction set.
Figure 7B:
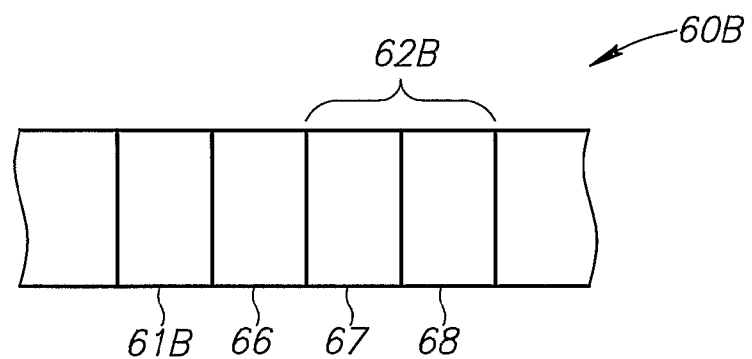
FIG. 7B is a schematic representation of a transmission message including an interactive display component having a single outbound response mechanism with an embedded instruction set.
Figure 7C:
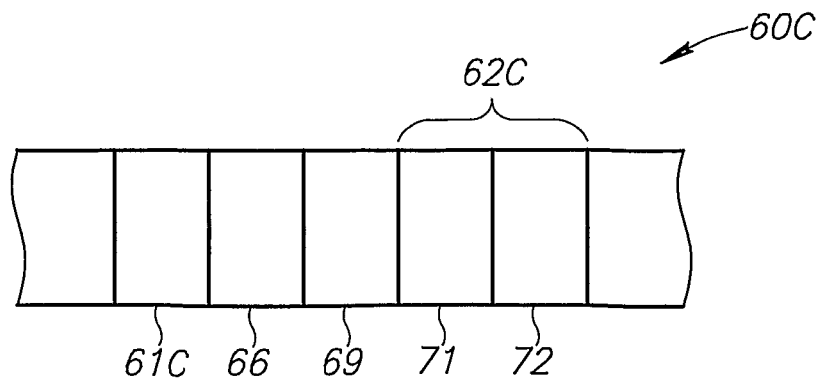
FIG. 7C is a schematic representation of a transmission message including an interactive display component having two outbound response mechanisms with an embedded instruction set.

FIGS. 7A to 7C show three transmission messages 60 each including a display component 61 and an associated embedded instruction set 62 for operation in conjunction with an onboard instruction set 43.

FIG. 7A shows a transmission message 60A with a non-interactive display component 61A with its associated embedded instruction set 62A. The instruction set 62A include a data logging category identifier 63 for specifying a data logging category for display component events and user impressions events of the display component 61A and a data reporting category identifier 64 for specifying a data reporting category for display component events and user impression events of the display component 61A. Alternatively, the data instruction set 62A can include separate data logging category identifiers and data reporting category identifiers for display component events and user impression events thereby enabling different data logging instructions and data reporting instructions to apply to the different event types.

FIG. 7B shows a transmission message 60B including an interactive display component 61B with its associated embedded instruction set 62B. The interactive display component 61B includes a single outbound response mechanism 66 specifying a callback number for initiating a voice call to a telephone number for obtaining additional information. The instruction set 62B includes a data logging category identifier 67 for specifying a data logging category for display component events, user impressions events, and user click events, and a data reporting category identifier 68 for specifying a data reporting category for display component events, user impression events and user click events of the display component 61B. Alternatively, the data instruction set 62B can include separate data logging category identifiers and data reporting category identifiers for display component events, user impression events, and user click events thereby enabling different data logging instructions and data reporting instructions to apply to the different event types.

FIG. 7C shows a transmission message 60C including an interactive display component 61C with its associated embedded instruction set 62C. The interactive display component 62C includes the outbound response mechanism 66 and an additional outbound response mechanism 69 with a link for browsing to a WAP site. The instruction set 62C includes a data logging category identifier 71 for specifying a data logging category for display component events, user impressions events, and user click events, and a data reporting category identifier 72 for specifying a data reporting category for display component events, user impression events and user click events of the display component 61C. Alternatively, the data instruction set 62C can include separate data logging category identifiers and data reporting category identifiers for display component events, user impression events, and user click events thereby enabling different data logging instructions and data reporting instructions to apply to the different event types.

Figure 8:
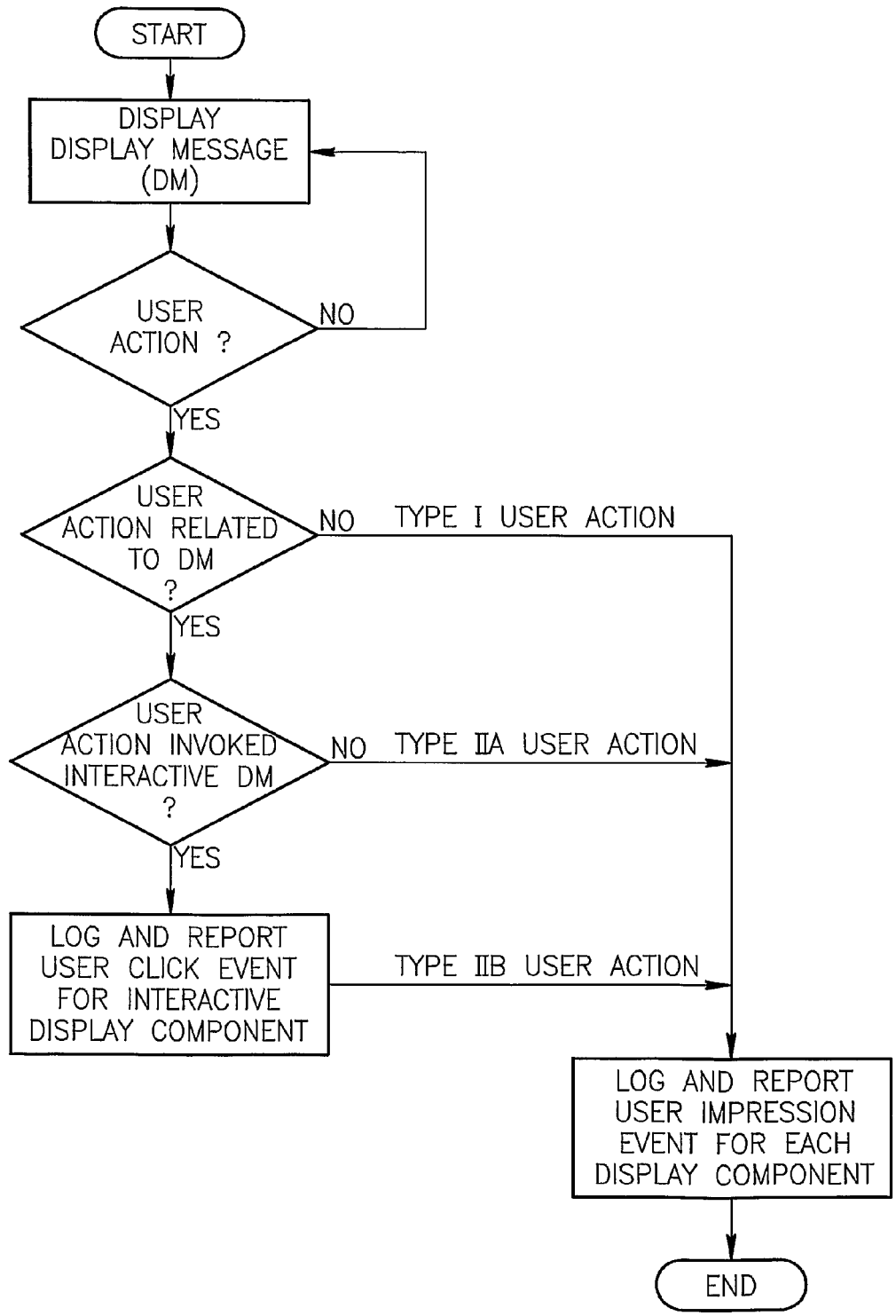
FIG. 8 is a flow diagram of the operation of a personal cellular telecommunications device for logging user impression information and user click information.

FIG. 8 shows a flow diagram of the operation of a personal cellular telecommunications device for logging user impression information and user click information and reporting same to the DCE 17. The device 30 displays display messages on its display screen. The display messages each include at least one interactive or non-interactive display component. A user may not effect a user action during the display of a particular instantaneously display message which is replaced by another display message. In the case the user effects a user action during the display of an instantaneously display message, the device determines whether the user action was directly related to the instantaneously displayed display message or not. In the affirmative, the user action is of a Type II type and, in the negative, the user action is of a Type I type. In the case of Type II user actions, the device determines whether the user action invoked an interactive display component or not. In the affirmative, the user action is of a Type IIB type and, in the negative, the user action is of a Type IIA type. The device logs and reports user impression events for each display component of instantaneously displayed display messages for Type I, IIA and IIB user actions according to their applicable user impression data logging and reporting instructions. The device logs and reports user click events for an invoked interactive display component of instantaneously displayed display messages according to its applicable user click data logging and reporting instructions.

FIG. 9 shows an exemplary Display Component Record Table 81 including three display component records. Each display component record includes the following information: Display Component ID, User MS-ISDN, Display Count, Impression Count and User Click Count. The table 81 exemplifies that display components are typically displayed more times than they are viewed and typically viewed more times than they are invoked assuming they are interactive. Idle screen applications are inclined to have a lower user impression count to display count ratio than a user initiated data application by the nature of the service.

FIG. 10 shows an exemplary User Impression Record Table 82 including three user impression records of user impression events. Each user impression record includes the following information: User MS-ISDN, Display Component ID, Event Time, Event Date, and User Action.

FIG. 11 shows an exemplary User Click Record Table 83 including three user click records of user click events. Each user click record includes the following information: User MS-ISDN, Display Component ID, Event Time, Event Date, Activated Outbound Response Mechanism, Transaction Type, Destination, Session Length and remarks.

The following scenarios demonstrate the use of the present invention:

Scenario 1: A mobile advertiser wants to run a mobile pilot campaign for house mortgages to compare two different single advert display components for advertising the same product for determining which single advert display component draws more user impressions. The mobile advertiser may decide that he wants to run the mobile pilot campaign for a week and may request daily reporting of user impressions. The advert display components may be non-interactive or interactive in which case the mobile advertiser may request immediate reporting of user clicks in addition to user impressions.

Scenario 2: A mobile advertiser runs a mobile advertising campaign of interactive advert display components for advertising a new restaurant chain and orders 10,000 user impressions at a cost of USD 50 per 1,000 user impressions and USD 1 per user click.

While the invention has been described with respect to a limited number of embodiments, it will be appreciated that many variations, modifications, and other applications of the invention can be made within the scope of the appended claims. For example, although a series of acts may be described with reference to a flow diagram, the order of the acts may differ in other implementations when the performance of one act is not dependent on the other. Further, non-independent acts may be performed in parallel. Moreover, whilst the present invention has been described in parts with reference to its GSM implementation, it is suitable for implementation by both existing or evolving technologies including inter alia PCS, GPRS, 3G, CDMA, UMTS, W-CDMA, CDMA2000 and the like, and/or both existing and still evolving services including inter alia MBMS, OMA BCAST, OMA DCD, DVB-H, DMB, and the like.

The invention claimed is:

1. A method for user activity tracking on a personal cellular telecommunications device in wireless communication with a network side Data Collection Entity (DCE), the personal cellular telecommunications device including a User Interaction Software Module (UISM), a Man Machine Interface (MMI), and a display screen, the method comprising the steps of:
(a) displaying display messages each including at least one display component on the display screen;
(b) correlating between user action events on the personal cellular telecommunications device and display component events for determining user impression events originated by at least user actions occurring during instantaneously displayed display messages and relating thereto but not invoking interactive display messages; and (c) logging user impression information of the user impression events.

2. The method as claimed in claim 1 wherein step (b) includes correlating between user action events and display component events for determining user impressions originated by user actions occurring during instantaneously displayed display messages but not relating thereto.

3. The method as claimed in claim 1 wherein step (b) includes correlating between user action events and interactive display component events for determining user impressions being originated by user actions invoking instantaneously displayed interactive display messages.

4. The method as claimed in claim 1 wherein user impression information of a user impression event of a display component includes the user action originating the user impression event.

5. The method as claimed in claim 1 wherein the UISM executes steps (b) and (c) and transmits user impression information of user impression events to the DCE.

6. The method as claimed in claim 5 wherein the UISM includes an onboard instruction set having at least one data handling instruction regarding data handling of user impression information of user impression events.

7. The method as claimed in claim 5 wherein the UISM includes an onboard instruction set having at least one data handling instruction regarding data handling of user click information of user click events.

8. The method as claimed in claim 5 wherein the UISM includes an onboard instruction set having at least one data handling instruction regarding data handling of display component information of display component events.

9. The method as claimed in claim 6 wherein a display component embedded instruction set includes at least one category identifier for identifying a data handling instruction of the onboard instruction set.

10. The method as claimed in claim 1 wherein the UISM and the DCE execute the following steps:
(b1) the UISM logs display component information including timing information of the display component events on the display screen,
(b2) the UISM logs user action information including timing information of the user action events on the MMI,
(b3) the UISM transmits the display component information and the user action information to the DCE,
(b4) the DCE correlates between the timing information of the user action events and the timing information of the display component events for determining user impression events, and
(c1) the DCE logs the user impression information of the user impression events.

11. The method as claimed in claim 10 wherein the UISM includes an onboard instruction set having at least one data handling instruction regarding data handling of the display component information.

12. The method as claimed in claim 11 wherein a display component embedded instruction set includes at least one category identifier for identifying a data handling instruction of the onboard instruction set.

13. The method as claimed in claim 1 wherein the UISM includes an onboard instruction set including a multitude of data handling instructions regarding user click events for invoking interactive display messages wherein the data handling instructions are destination dependent.

14. The method as claimed in claim 13 wherein the onboard instruction set includes two different data handling instructions applying to two outbound response mechanism of the same type and where one data handling instruction applies to one destination and the other data handling instruction applies to another destination.

15. The method as claimed in claim 11 wherein the onboard instruction set includes data handling instructions regarding at least one of outbound data sessions, and outbound voice calls and outbound text messages.

16. The method as claimed in claim 1 wherein the personal cellular telecommunications device displays display messages during an idle screen application.

17. The method as claimed in claim 1 wherein the personal cellular telecommunications device displays display messages during a user initiated data application.

18. Cellular telecommunications network for user activity tracking on personal cellular telecommunications devices as claimed in claim 1.

19. Personal cellular telecommunications device for user activity tracking thereon as claimed in claim 1.

20. A method for user activity tracking on a personal cellular telecommunications device in wireless communication with a network side Data Collection Entity (DCE), the personal cellular telecommunications device including a User Interaction Software Module (UISM) having an onboard instruction set, a Man Machine Interface (MMI), and a display screen, the method comprising the steps of:
(a) providing interactive display components for transmission to personal cellular telecommunications devices for display in interactive display messages thereon, the interactive display components each including at least one outbound response mechanism for obtaining additional information;
(b) configuring the onboard instruction set regarding data handling of user click information of user click events originated by user actions invoking instantaneously displayed interactive display messages, the onboard instruction set including a multitude of data handling instructions wherein at least one data handling instruction has a destination condition; and
(c) displaying interactive display messages on a personal cellular telecommunications device, whereupon a user action invoking an interactive display message activates an outbound response mechanism and constitutes a user click event and the personal cellular telecommunications device transmits user click information of the user click event to the DCE in accordance with the data handling instruction corresponding to the destination of the activated outbound response mechanism.

21. The method as claimed in claim 20 wherein the onboard instruction set includes two different data handling instructions applying to two outbound response mechanisms of the same type and where one data handling instruction applies to one destination and the other data handling instruction applies to another destination.

22. The method as claimed in claim 20 wherein the onboard instruction set includes at least one data handling instruction regarding data logging of user click information of user click events.

23. The method as claimed in claim 20 wherein the onboard instruction set includes at least one data handling instruction regarding data reporting of user click information to the DCE.

24. The method as claimed in claim 20 wherein the onboard instruction set includes data handling instructions regarding outbound data sessions.

25. The method as claimed in claim 20 wherein the onboard instruction set includes data handling instructions regarding outbound voice calls.

26. The method as claimed in claim 20 wherein the onboard instruction set includes data handling instructions regarding outbound text messages.

27. The method as claimed in claim 20 wherein the personal cellular telecommunications device displays display messages during an idle screen application.

28. The method as claimed in claim 20 wherein the personal cellular telecommunications device displays display messages during a user initiated data application.

29. Cellular telecommunications network for user activity tracking on personal cellular telecommunications devices as claimed in claim 20.

30. Personal cellular telecommunications device for user activity tracking thereon as claimed in claim 20.

31. A method for user activity tracking on a personal cellular telecommunications device in wireless communication with a network side Data Collection Entity (DCE), the personal cellular telecommunications device including a User Interaction Software Module (UISM) having an onboard instruction set, a Man Machine Interface (MMI), and a display screen, the method comprising the steps of:
 (a) defining at least one data handling category regarding data handling of events associated with the display of display messages each including at least one display component on the display screen;
 (b) configuring the onboard instruction set with a data handling instruction corresponding to each data handling category;
 (c) providing display components with an embedded instruction set including at least one category identifier for identifying a data handling category; and
 (d) transmitting display components for display in display messages on the display screen whereupon the UISM data handles event information of each instantaneously displayed display component in accordance with its corresponding at least one data handling category.

32. The method as claimed in claim 31 wherein the embedded and onboard instruction sets include at least one data handling category regarding data logging of display component information of display component events.

33. The method as claimed in claim 31 wherein the embedded and onboard instruction sets include at least one data handling category regarding data reporting of display component information of display component events to the DCE.

34. The method as claimed in claim 31 wherein the embedded and onboard instruction sets include at least one data handling category regarding data logging of user impression information of user impression events.

35. The method as claimed in claim 31 wherein the embedded and onboard instruction sets include at least one data handling category regarding data reporting of user impression information of user impression events to the DCE.

36. The method as claimed in claim 31 wherein the embedded and onboard instruction sets include at least one data handling category regarding data logging of user click information of user click events.

37. The method as claimed in claim 31 wherein the embedded and onboard instruction sets include at least one data handling category for data reporting of user click information of user click events to the DCE.

38. The method as claimed in claim 31 wherein the personal cellular telecommunications device displays display messages during an idle screen application.

39. The method as claimed in claim 31 wherein the personal cellular telecommunications device displays display messages during a user initiated data application.

40. Cellular telecommunications network for user activity tracking on personal cellular telecommunications devices as claimed in claim 31.

41. Personal cellular telecommunications device for user activity tracking thereon as claimed in claim 31.

* * * * *